United States Patent [19]

Wang

[11] Patent Number: 5,344,119
[45] Date of Patent: Sep. 6, 1994

[54] HOSE COUPLING

[76] Inventor: Der-Shing Wang, P.O. Box 1750, Taichung, Taiwan

[21] Appl. No.: 124,862

[22] Filed: Sep. 21, 1993

[51] Int. Cl.5 .............................................. F16L 29/02
[52] U.S. Cl. ................................ 251/149.1; 137/329.2
[58] Field of Search .................. 251/149, 149.1, 149.4, 251/149.5, 148, 319, 324, 325, 359, 360; 137/801, 329.1, 329.2

[56] References Cited

U.S. PATENT DOCUMENTS

| | | | |
|---|---|---|---|
| 1,304,248 | 5/1919 | Beaton et al. | 251/149.4 |
| 1,471,427 | 10/1923 | Towle . | |
| 1,550,850 | 8/1925 | Towle | 251/149.1 |
| 1,700,632 | 1/1929 | Gay . | |
| 1,810,735 | 6/1931 | Smith . | |
| 1,815,501 | 7/1931 | Francis et al. | 251/149.1 X |
| 2,502,206 | 3/1950 | Creek | 251/149.1 |
| 5,110,088 | 5/1992 | Shih | 251/149.1 |

Primary Examiner—Martin P. Schwadron
Assistant Examiner—Kevin L. Lee

[57] ABSTRACT

A hose coupling includes a cylindrical member for coupling a faucet, an annular rib formed in the the cylindrical member, a ring element threadedly engaged in the cylindrical member, a packing engaged between the annular rib and the ring element so as to make a water tight seal between the annular rib and the ring element, a tube is slidably engaged in the packing and the ring element and has a bore, one or more holes are formed in the tube and communicated with the bore of the tube, the water is cut off when the holes are blocked and are opened when the holes are disengaged from the packing.

1 Claim, 3 Drawing Sheets

HOSE COUPLING

BACKGROUND OF THE INVENTION (a) Field of the Invention

The present invention relates to a coupling, and more particularly to a hose coupling.

(b) Description of the Prior Art

Various kinds of hose couplings have been developed and widely used, some of the hose couplings are shown in U.S. Pat. No. 1,471,427 to Towle, U.S. Pat. No. 1,550.850 to Towle, U.S. Pat. No. 1,700,632 to Gay, and U.S. Pat. No. 1,810,735 to Smith; all of the hose couplings include a complicated configuration, a silicon tape is required to be wound on the coupling portion of the hoses in order to make a water tight seal. In Towel '427, it is difficult to make a water tight seal between the lock lug and the lock member, and between the pipes. In Towel '850, the hoses and the coupling should be machined with a plurality of ribs, which greatly increases the manufacturing cost thereof. In Gay, a packing washer, a bushing and a packing nut should be disposed within the coupling in order to form a water tight seal. In Smith, it is very difficult to made a water tight seal between the coupling and the hose members, The present invention has arisen to mitigate and/or obviate the afore-described disadvantages of the conventional hose couplings.

SUMMARY OF THE INVENTION

The primary objective of the present invention is to provide a hose coupling with which the faucet can be easily coupled to the water pipe without cutting off the water supplied into the water pipe, and a water tight seal can be easily formed within the coupling.

In accordance with one aspect of the present invention, there is provided a hose coupling for coupling a faucet comprising a body including a cylindrical member having a first end, a middle portion and a second end, an annular rib formed in the first end of the cylindrical member, an inner thread formed in the middle portion and the second end of the cylindrical member for engaging with the faucet; a ring element threadedly engaged with the inner thread of the cylindrical member, a packing engaged between the annular rib and the ring element so as to make a water tight seal between the annular rib and the ring element and including a bevel formed therein and close to the annular rib, a tube slidably engaged in the packing and the ring element and including a bore formed therein, the tube including a first end having a tapered surface formed on an outer peripheral surface thereof for engaging with the bevel of the packing and including a second end having a panel secured thereon, the panel being located close to the second end of the body for engaging with the ring element so as to limit the movement of the tube, at least one hole formed in the tube close to the first end of the tube and communicated with the bore of the tube, the hole being blocked when the tapered surface of the first end of the tube is engaged with the bevel of the packing such that water supplied into the coupling is blocked and prevented from flowing through the tube, the packing making a water tight seal between the tube and the ring element, and the hole being opened when the panel is engaged with the ring element and when the tapered surface of the tube is disengaged from the bevel of the packing, whereby, water supplied into the coupling is allowed to flow into the tube via the hole and to flow out of the coupling through the bore of the pipe.

The faucet can be easily engaged to the water pipe and disengaged from the water pipe by the hose coupling without cutting off the water supplied into the water pipe. In addition, no seal tape is required to make water tight seals in the hose coupling.

Further objectives and advantages of the present invention will become apparent from a careful reading of the detailed description provided hereinbelow, with appropriate reference to the accompanying drawings.

DETAILED DESCRIPTION OF THE INVENTION

Figure 1:
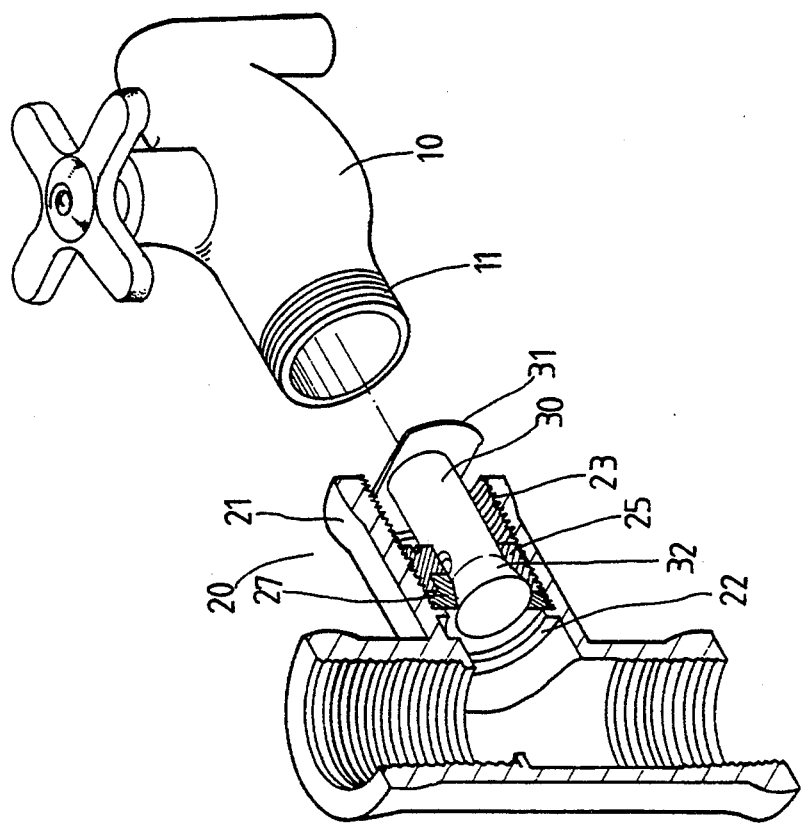
FIG. 1 is an exploded view of a hose coupling in accordance with the present invention.
Figure 3:
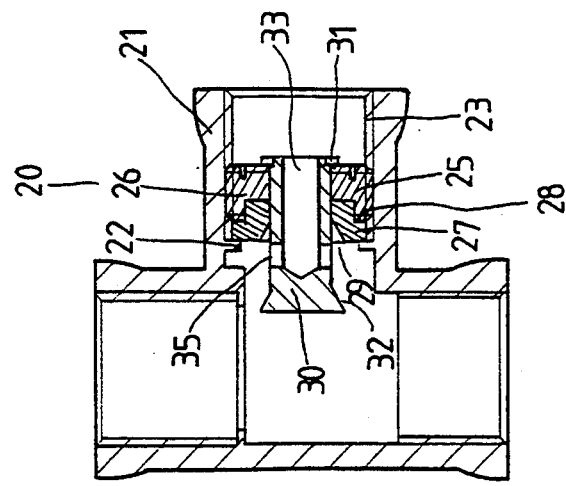
FIGS. 2 and 3 are cross sectional views of the hose coupling illustrating the operations thereof.
Figure 2:
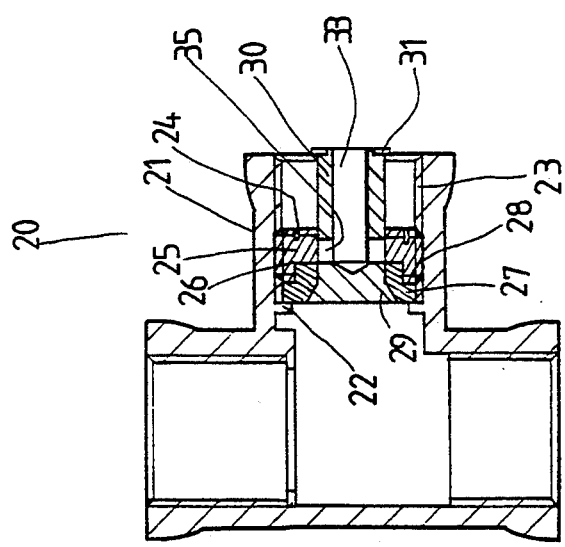

Referring to the drawings and initially to FIGS. 1 to 3, a hose coupling in accordance with the present invention comprises a three-way body 20 for coupling a faucet 10 and a hose or the like (not shown), the body 20 comprises a cylindrical member 21 including a first end having an annular rib 22 formed therein and including an inner thread 23 formed in the middle portion and formed in the second end portion for threadedly engaging with the outer thread 11 of the faucet 10, a ring element 25 having an outer thread formed in the outer peripheral portion thereof for threadedly engaging with the inner thread 23 of the cylindrical member 21, a packing 27 which is preferably made of silicon materials being engaged between the annular rib 22 and the ring element 25, the packing 27 including an annular shoulder 28 formed therein for engaging with the annular protrusion 26 of the ring element 25, and the packing 27 including a bevel 29 formed in one end of the bore thereof close to the annular rib 22. The ring element 25 includes one or more holes 24 formed therein and facing toward the second end of the cylindrical member 21 for engaging with tools (not shown) which are provided to rotate the ring element 25 into the cylindrical member 21. The packing 27 makes an excellent water tight seal between the annular rib 22 and the ring element 25.

A tube 30 is slidably engaged in the ring element 25 and the packing 27, and includes a panel 31 secured on the first end thereof for engaging with the ring element 25 so as to limit the axial movement of the tube 30, and includes a tapered surface 32 formed on the second end thereof for engaging with the bevel 29 of the body 20, the tube 30 includes a bore 33 formed therein and opened through the first end of the tube, the bore 33 is not opened through the second end of the tube 30, one or more holes 35 are formed in the tube close to the second end thereof and communicated with the bore 33 of the tube 30.

In operation, as shown in FIG. 3, the panel 31 is forced to engage with the ring element 25 and the holes 35 of the tube 30 are disengaged from the packing 27, at this moment, the water from the first end of the tube 20 may flow through the holes 35 and may flow into the bore 33 of the tube 30, and then may flow out of the body 20 such that the water supplied into the coupling may flow out through the faucet 10. It is to be noted that the tube 30 can be maintained in the leftward position as shown in FIG. 3 when the faucet is engaged in the second end of the body 20, i.e., the panel 31 is engaged with the faucet 10 and forced leftward by the faucet 10.

As shown in FIG. 2, when the faucet 10 is disengaged from the body 20, the water pressure of the water supplied into the coupling forces the tube 30 to move rightward until the tapered surface 32 of the tube 30 is engaged with the bevel 29 of the body 20, at this moment, the holes 35 of the tube 30 are engaged in the ring element 25 such that the bore 33 of the tube 30 enclosed, a water tight seal can be suitably formed between the packing 27 and the tube 30, whereby, the water supplied into the coupling can be blocked and prevented from flowing out of the body 20.

Accordingly, when disposing the hose coupling in the end portion of a water pipe, the faucet can be easily engaged to the water pipe and disengaged from the water pipe without cutting off the water supplied into the water pipe. The packing 27 makes an excellent water tight seal among the cylindrical member 21, the ring element 25 and the tube 30, no sealing tape is required to make water tight seal of the hose coupling.

Figure 4:
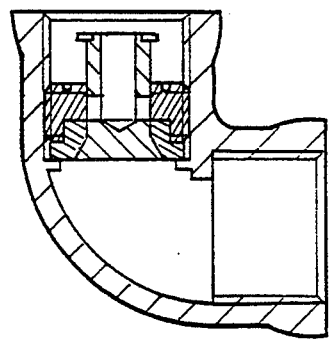
FIG. 4 is a cross sectional view hose coupling, showing another type of the hose coupling.

As shown in FIG. 4, instead of a three-way coupling, the hose coupling can also be used in an elbow, the faucet can also be easily engaged to the elbow without cutting off the water supplied into the elbow.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A hose coupling for coupling a faucet comprising a body including a cylindrical member having a first end, a middle portion and a second end, an annular rib formed in said first end of said cylindrical member, an inner thread formed in said middle portion and said second end of said cylindrical member for engaging with said faucet; a ring element threadedly engaged with said inner thread of said cylindrical member, a packing engaged between said annular rib and said ring element so as to make a water tight seal between said annular rib and said ring element and including a bevel formed therein and close to said annular rib, a tube slidably engaged in said packing and said ring element and including a bore formed therein, said tube including a first end having a tapered surface formed on an outer peripheral surface thereof for engaging with said bevel of said packing and including a second end having a panel secured thereon, said panel being located close to said second end of said body for engaging with said ring element so as to limit the movement of said tube, at least one hole formed in said tube close to said first end of said tube and communicating with said bore of said tube, said hole being blocked when said tapered surface of said first end of said tube is engaged with said bevel of said packing such that water supplied into said coupling is blocked and prevented from flowing through said tube, said packing making a water tight seal between said tube and said ring element, and said hole being opened when said panel is engaged with said ring element and when said tapered surface of said tube is disengaged from said bevel of said packing, whereby, water supplied into said coupling is allowed to flow into said tube via said hole and to flow out of said coupling through said bore of said tube.

* * * * *